United States Patent Office 2,921,860
Patented Jan. 19, 1960

2,921,860
OPAL GLASS

Stanley D. Stookey, Corning, N.Y., assignor to Corning Glass Works, Corning, N.Y., a corporation of New York No Drawing. Application December 9, 1954
Serial No. 474,300

12 Claims. (Cl. 106—52)

This invention relates to glasses having a light-diffusing crystallite phase and commonly referred to as opacified or opal glasses. It is particularly directed to fluoride opal glasses in which the light-diffusing crystallite phase is composed primarily of alkali fluorides and "strikes in," that is develops or separates in the glass, very rapidly, and to the production of incandescent lamp bulbs and similar light transmitting glassware from such glasses.

The rate at which opal glasses strike may vary markedly, some glasses developing an opacifying crystallite phase so slowly as to be thermally opacifiable, that is clear or transparent when initially molded and cooled, and requiring a subsequent heat treatment for opal development. However, for commercial production a spontaneously opacifiable glass is generally desired, that is one which strikes in fully during the cooling cycle incidental to a given molding process. In hand molding and automatic pressing operations at least ten seconds time, and as much as a minute or more, is usually available for striking in the opal phase. Further, such operations are sufficiently flexible that the process can readily be adapted to a particular glass with no serious consequence other than a slow production rate.

The situation is altogether different, however, in considering production of opal glassware on high speed, automatic blowing machines. For example, machines used in blowing certain types of incandescent lamp bulb envelopes, when operating under standard conditions, allow no more than a second or two for complete opal development. Further, the working cycle on such a machine is so sensitive and so closely related to ware specifications that any substantial modification is quite infeasible. While the exact time will vary somewhat depending on the particular machine and type of ware involved, a suitable opal glass should strike within at most five seconds and preferably much more rapidly. Heretofore, however, there have not been available opal glasses which strike with such rapidity, and which are otherwise suitable for such production. It is then a primary purpose of this invention to provide opal glasses having general utility but particularly adapted to fill this need.

In the production of incandescent lamp bulbs, it is also a matter of prime concern to mask or hide as completely as possible the lamp filament during operation. This means that an opal glass suitable for producing such bulbs must possess a high degree of light diffusion; and a further purpose of this invention is to provide opal glasses and glassware which possess this characteristic. To this end it has been found that maximum light diffusion is achieved with diffusing crystallites which are so controlled in size that their diameters are of the same order of magnitude as are the wave lengths of light in the visible part of the spectrum. In addition to their insufficient light diffusion, smaller crystallites tend to produce a fiery appearance in transmitted light and larger crystallites tend to produce a brittle or weak glass.

An opal glass suitable for the present purposes must also meet various requirements with respect to physical properties, particularly viscosity and expansion characteristics. Among other things, such properties determine the ease with which a glass may be melted and worked as well as its suitability for subsequent use such as sealing to metal in lamp production. For example, the working temperature of a glass, that is, the temperature at which the glass is delivered for molding operations, is based on glass viscosity; and the working temperature of a glass suitable for the automatic production here contemplated corresponds generally to a viscosity of about 700 poises. In turn, however, the liquidus temperature of a suitable glass must be well below its working temperature in order to avoid uncontrolled crystal development. Also, a suitable glass for lamp bulb production should have an expansion coefficient of about $90-95 \times 10^{-7}$ per cm. per cm. per degree C. from 0°–300° C. in view of established commercial sealing methods and equipment.

Fluoride-type opals have been known for many years, particularly glasses containing a fluoride of the alkaline earth metals, such as calcium, as an opacifying medium. It has been found, however, that such glasses either strike too slowly or possess too high a liquidus for present purposes. The liquidus of a glass is the maximum temperature at which equilibrium exists between the molten glass and its primary crystalline phase. Thus a glass having a high liquidus will tend toward uncontrolled crystal development or devitrification within the delivery chamber of the melting unit.

Glasses have also been previously proposed which consist essentially of silica, alkali metal oxides, alumina, and fluorine, the opal crystallite phase in such glasses being primarily alkali metal fluoride. The latter are especially attractive because of their low batch cost and potential freedom from such materials as water and boron compounds which tend to remove fluorine by volatilization. However, these glasses strike so slowly that they tend to be thermally, rather than spontaneously, opacifiable and hence unsuitable. While their striking speed may be increased somewhat with relatively large additions of fluorine unfortunately the liquidus temperature is also sharply increased thus restricting the use of such an expedient.

I have now discovered that by incorporating a minor amount of $Li_2O$ in such alkali metal fluoride glasses the rate at which such glasses "strike in" is radically increased while at the same time, surprisingly enough, the liquidus temperature of the glass is lowered at much as 50–100° C., thus permitting the presence of added quantities of fluorine. This combination, in turn, effects crystallite nucleating and growth conditions particularly conducive to development of the desired size crystallites for optimum light diffusion. As a result of this discovery it is now possible to produce glasses capable of meeting the various requirements noted above and suitable for working on high-speed automatic blowing machines.

The glasses of the present invention comprise essentially 55–75% $SiO_2$, 2–12% $Al_2O_3$, 0.5–3.0% $Li_2O$, at least 6% $Na_2O$, the total alkali metal oxide content being 12–20%, and 5–9% F. These essential constituents must account for at least 83% of the total composition.

Glasses containing one or more of the above constituents in amounts appreciably outside the recited ranges are unsuitable for various reasons. Thus an excess of $SiO_2$ or $Al_2O_3$, or a deficiency in total alkali metal oxide, produces a glass that is so hard or viscous as to be too difficult to melt and work. On the other hand, a deficiency in $SiO_2$ or $Al_2O_3$, or an excess of alkali metal oxide, produces too soft a glass and also one that has poor chemical durability as evidenced by clouding, filming, or other deterioration of the glass surface. This is particularly serious in connection with lamp envelopes since it interferes with proper sealing of parts, as well as with lamp efficiency.

In order to produce the characteristic rapid "strike in" rate of an opal phase composed primarily of crystallites in the desired size range, at least a half percent of $Li_2O$ is required. The optimum effect in this respect is achieved with about 1% $Li_2O$, although amounts up to 3% may be present without unduly softening the glass. The opal crystallites in the present glasses are at least predominantly NaF and at least 6% $Na_2O$ is necessary for proper opal density. $K_2O$ does not appear to be appreciably involved in development of an opal phase but does improve chemical durability, particularly in conjunction with the other alkali metal oxides, and may be used to advantage in effecting a proper viscosity-liquidus relation.

The presence of F is, of course, essential for development of an opal phase. Also the rate of striking increases markedly with F content. At least 5% is required for these purposes, but over about 9% imparts too high a liquidus to the glasses and tends to cause devitrification.

Various other glass-making oxides may be present in compatible amounts. Among these are the divalent oxides BeO, MgO, CaO, ZnO, SrO, CdO, and BaO in an amount up to 6%, taken individually and collectively. These oxides, particularly CaO, BaO, and ZnO, tend to improve the weathering or chemical durability characteristics of the glasses. However, their presence markedly slows the striking rate of the opacifying crystallites and for that reason not more than about 6% of any one or any combination of the oxides can be tolerated.

Up to 6% PbO and up to 5% $B_2O_3$ may be advantageously used to adjust physical properties such as viscosity and expansion coefficient. An excess of PbO tends to unduly soften the glasses while the use of $B_2O_3$ is limited by its tendency to volatilize during melting and remove F from the glass.

In further explanation of my invention the following table sets forth, in units by weight, batches from which illustrative glasses may be melted:

Table I

|  | 1 | 2 | 3 | 4 | 5 | 6 | 7 | 8 |
|---|---|---|---|---|---|---|---|---|
| $SiO_2$ | 668 | 231 | 232 | 214 | 254 | 280 | 270 | 201 |
| $Na_2CO_3$ | 73.5 | 39 | 32 | 52 | 39 | 89 | 33 | 20 |
| $NaNO_3$ | 28 | 14 | 7 | 7 | 7 | 14 | 14 | 14 |
| $K_2CO_3$ | 105 | 27.5 | 49 | 14 | 42 | | 42 | 28 |
| $Li_2CO_3$ | 24.5 | | | | | | | |
| Lepidolite | | 114 | 114 | 114 | 114 | 114 | 114 | 57 |
| $Al(OH)_3$ | 126 | | | | | | | |
| Feldspar | | 68 | 82 | 82 | 27 | | | 157 |
| $Na_2SiF_6$ | 112 | 44 | 37 | 28 | 37 | 37 | 36 | 43 |
| $CaF_2$ | 14.5 | | | | | | | |
| $CaCO_3$ | | 9 | | | | | 9 | 9 |
| $BaCO_3$ | 32 | 16 | | 38 | | | 16 | 16 |
| ZnO | | | | | 15 | 15 | 7.5 | |
| $PbSiO_4$ | | | | | 18 | 18 | 23 | |
| $As_2O_3$ | 4 | 2 | | | | | | |

Table II sets forth glass compositions corresponding to, and calculated in weight percent from, the respective batches recited in Table I:

Table II

|  | 1 | 2 | 3 | 4 | 5 | 6 | 7 | 8 |
|---|---|---|---|---|---|---|---|---|
| $SiO_2$ | 65.6 | 66.1 | 67.2 | 64.8 | 64.4 | 65.9 | 64.1 | 66.0 |
| $Na_2O$ | 8.4 | 8.5 | 7.0 | 8.3 | 7.1 | 12.6 | 7.1 | 8.0 |
| $K_2O$ | 6.8 | 6.8 | 10.0 | 5.7 | 9.1 | 2.9 | 7.5 | 8.0 |
| $Li_2O$ | 0.9 | 0.9 | 1.0 | 1.0 | 1.0 | 1.0 | 1.0 | 0.5 |
| $Al_2O_3$ | 7.7 | 7.8 | 8.9 | 9.3 | 7.2 | 6.1 | 6.2 | 8.4 |
| BaO | 2.3 | 2.3 | | 5.9 | | | 2.3 | 2.3 |
| ZnO | | | | | 2.8 | 2.9 | 1.5 | |
| CaO | 1.0 | 1.0 | | | | | 1.0 | 1.0 |
| PbO | | | | | 2.8 | 2.9 | 3.7 | |
| $As_2O_3$ | 0.4 | 0.4 | | | | | | |
| F | 6.9 | 6.2 | 5.6 | 5.0 | 5.6 | 5.7 | 5.6 | 5.6 |

In calculating the compositions of Table II the batch formulae of Table I were converted to corresponding oxide percentages totaling one hundred and the fluorine content calculated separately. These percentages were then proportionally reduced to allow for the fluorine content. The resulting compositions are necessarily only approximations, it being impossible to present absolutely accurate compositions since it is not known exactly what compounds of fluorine are formed in the glass nor to what extent.

Experience indicates moreover that a part of the fluorine content is inevitably lost during melting, the exact amount depending on numerous factors including the temperatures, atmosphere and construction of the melting unit and influence of other batch materials. The batch of Example I was melted in a large commercial tank and the resulting glass, when analyzed, was found to contain 5.2% F. Using this as a guide the glass batches of the present invention may be expected to lose about one quarter of their fluorine content during melting and hence may be expected to contain about 4 to 7% analytically determined fluorine.

Due to the numerous and complex factors which influence the rate of crystallite development in an opal glass, it is not feasible to attempt accurate quantitative comparisons. However, in experimental studies involving the present glasses a qualitative evaluation test was devised which involved heating a small piece of glass, a few grams in weight, up to a temperature well above the liquidus temperature and then quickly drawing the molten mass into a fiber. This test was adopted in an effort to simulate the rapidity of cooling and handling involved in blowing a body of glass into a thin walled article on automatic machinery. Glasses were evaluated on the density of opal development, if any, in the drawn fiber.

By way of illustrating further the effect of $Li_2O$ in the present glasses, reference is made to a test involving two glasses, designated A and B, and having essentially the same composition as that of Example 3 except that both glasses, as calculated from their batch, contained about 4.3% F. Also Glass A contained no $Li_2O$ while Glass B contained about 1%. When evaluated by the fiber test described above, Glass A produced a substantially clear fiber while that of B was fully opacified although not quite as dense as desired. Further the liquidus of Glass B was about 860° C.—about 50° C. below that of Glass A—thereby permitting incorporation of added amounts of F whereby the striking rate and opal density were suitably increased while maintaining the liquidus at about the same temperature as the original non-$Li_2O$ glass, that is about 910° C.

As would be assumed, the resulting glass, Example 3, can be melted in accordance with conventional glass melting practice which is well described for example by S. R. Scholes in chapter XII of his "Modern Glass Practice," Rev. Ed., Industrial Publications, Inc., Chicago, 1948. Thus, if it were to be melted in a large continuous gas fired tank, the actual temperature of glass delivered from the tank to the forming machine would be slightly above the liquidus temperature to avoid crystallization within the delivery chamber or bowl. The temperature in the working end, or thermal conditioning portion, of the tank would be somewhat higher, e.g. 1100–1200° C., and the maximum temperature in the melting end of the tank would be still higher, e.g. about 1300–1500° C. While conventional glass melting practice suggests temperatures within the indicated ranges to be feasible, the specific temperatures selected for a specific melting operation would, of course, be determined by the circumstances surrounding that operation.

While the present glasses possess general utility they were primarily designed for use in conjunction with automatic glass working machinery such as the blowing machine described in Woods et al. U.S. Patent No. 1,790,397. In operating such a machine, glass is melted and fined in a large tank, passed into a delivery chamber such as a forehearth or bowl for thermal conditioning and from there delivered in stream form, from an orifice. The stream is flattened between rolls into a ribbon or narrow sheet from which hollow glass articles such as lamp envelopes are subsequently molded at periodic intervals and then separated by a crack-off device.

The glass stream must be maintained at a temperature such that it is substantially free from crystallites as it leaves the delivery chamber and is shaped into a ribbon. On the other hand, opal development must be substantially completed by the time the glass ribbon reaches the initial molding or blowing station since at that stage at least a portion of the glass will be at too low a temperature for further crystallite development. Accordingly, the opal crystallite phase in the glass must be completely developed or struck in during the time interval in which the glass passes from the rolls to the mold, a time interval which may be as long as about five seconds, but preferably is not over one to two seconds.

What is claimed is:

1. An opal glass which, as calculated in weight percent from batch composition, consists essentially of 55–75% $SiO_2$, 2–12% $Al_2O_3$, 0.5–3% $Li_2O$, 6–19½% $Na_2O$, the total alkali metal oxide content being 12–20%, and 5–9% F, the essential constituents totaling at least 83%, said glass being spontaneously opacifiable during molding of an article therefrom.

2. An opal glass as claimed in claim 1, which includes up to 13½% $K_2O$.

3. An opal glass as claimed in claim 1, which includes at least one divalent metal oxide selected from the group consisting of BeO, MgO, CaO, ZnO, SrO, CdO, and BaO, the total content of such oxides, being not over 6%.

4. An opal glass as claimed in claim 3, which includes up to 6% PbO.

5. An opal glass as claimed in claim 1, which includes up to 5% $B_2O_3$.

6. An opal glass as claimed in claim 1, which includes up to 6% PbO.

7. An opal glass which, as calculated in weight percent from batch composition, consists essentially of 55–75% $SiO_2$, 2–12% $Al_2O_3$, ½–3% $Li_2O$, 6–19½% $Na_2O$, 0–13½% $K_2O$, the total alkali metal oxide content being 12–20%, 5–9% F, 0–6% of the divalent metal oxides BeO, MgO, CaO, ZnO, SrO, CdO, and BaO, 0–6% PbO and 0–5% $B_2O_3$, said glass being spontaneously opacifiable during molding of an article therefrom.

8. An opal glass which, as calculated in weight percent from batch composition, consists approximately of 65.6% $SiO_2$, 8.4% $Na_2O$, 6.8% $K_2O$, 0.9% $Li_2O$, 7.7% $Al_2O_3$, 1.0% CaO, 2.3% BaO, 0.4% $As_2O_3$, and 6.9% F, said glass being spontaneously opacifiable during molding of an article therefrom.

9. A method of producing light-diffusing glass articles on automatic glass blowing apparatus which comprises melting a batch to form a glass which, as calculated in weight percent from batch composition, consists essentially of 55–75% $SiO_2$, 2–12% $Al_2O_3$, 0.5–3% $Li_2O$, 6–19½% $Na_2O$, the total alkali metal oxide content being 12–20%, and 5–9% F, the essential constituents totaling at least 83%, delivering said molten glass to an automatic blowing machine, said glass being substantially free from crystallites as delivered from its melting unit, molding the glass on said machine into rigid, hollow glass articles, and developing within the glass, during the time interval between delivery and initiation of the molding cycle, a dense dispersion of light diffusing crystallites composed primarily of alkali fluorides.

10. A light-diffusing glass article containing alkali metal fluoride light-diffusing crystallites and produced from a glass consisting essentially of 55–75% $SiO_2$, 2–12% $Al_2O_3$, 0.5–3% $Li_2O$, 6–19½% $Na_2O$, the total alkali metal oxide content being 12–20%, and 5–9% F, the essential constituents totaling at least 83%.

11. A light-diffusing glass article in accordance with claim 10 and in which the diameters of the light-diffusing crystallites are of the same order of magnitude as the wave length of visible light.

12. A method of producing a light-diffusing glass article which comprises delivering from a glass melting chamber a body of glass substantially free of crystallites, initiating a molding cycle for such glass within five seconds after it is delivered from the melting chamber and, within such time interval, developing within the glass a dense dispersion of light-diffusing crystallites composed primarily of alkali metal fluorides.

References Cited in the file of this patent

UNITED STATES PATENTS

| | | |
|---|---|---|
| 2,224,469 | Blau | Dec. 10, 1940 |
| 2,527,693 | Armistead | Oct. 31, 1950 |
| 2,571,242 | Hood | Oct. 16, 1951 |
| 2,596,990 | Doyle | May 20, 1952 |
| 2,610,444 | Kurz | Sept. 16, 1952 |
| 2,683,666 | Duncan et al. | July 13, 1954 |

FOREIGN PATENTS

| | | |
|---|---|---|
| 492,960 | Great Britain | 1938 |

OTHER REFERENCES

Modern Glass Practice, Scholes, pp. 193–196, 1947.
The Glass Industry, February 1935, page 51.